United States Patent
Ide

(10) Patent No.: US 10,456,853 B2
(45) Date of Patent: Oct. 29, 2019

(54) ARC WELDING CONTROL METHOD

(71) Applicant: DAIHEN CORPORATION, Osaka (JP)

(72) Inventor: Akihiro Ide, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 419 days.

(21) Appl. No.: 15/105,714

(22) PCT Filed: Jan. 8, 2015

(86) PCT No.: PCT/JP2015/050384
§ 371 (c)(1),
(2) Date: Jun. 17, 2016

(87) PCT Pub. No.: WO2015/107974
PCT Pub. Date: Jul. 23, 2015

(65) Prior Publication Data
US 2017/0001254 A1    Jan. 5, 2017

(30) Foreign Application Priority Data

Jan. 15, 2014   (JP) ................................ 2014-004700

(51) Int. Cl.
*B23K 9/12* (2006.01)
*B23K 9/073* (2006.01)
(Continued)

(52) U.S. Cl.
CPC .............. *B23K 9/125* (2013.01); *B23K 9/073* (2013.01); *B23K 9/09* (2013.01); *B23K 9/0953* (2013.01)

(58) Field of Classification Search
CPC ......... B23K 9/095; B23K 9/00; B23K 9/1006
(Continued)

(56) References Cited

U.S. PATENT DOCUMENTS 5,973,291 A * 10/1999 Kramer .................. B23K 9/125
                                                     219/130.01
2006/0016792 A1* 1/2006 Uecker ................ B23K 9/0735
                                                     219/137.71
(Continued)

FOREIGN PATENT DOCUMENTS

CN        102149501        8/2011
EP         2402104         1/2012
(Continued)

OTHER PUBLICATIONS

International Search Report and Written Opinion issued in International Patent Application No. PCT/JP2015/050384, dated Apr. 14, 2015, together with an English language translation thereof.
(Continued)

*Primary Examiner* — Tu B Hoang
*Assistant Examiner* — Thomas J Ward
(74) *Attorney, Agent, or Firm* — Greenblum & Bernstein, P.L.C.

(57) ABSTRACT

There is provided an arc welding control method of alternating feeding of a welding wire between forward feeding and reverse feeding periodically according to a feeding rate pattern constituted of a forward feeding amplitude, a reverse feeding amplitude, a forward feeding period and a reverse feeding period, stored in correspondence to an average feeding rate setting value, and generating short-circuiting periods and arc periods to perform welding. An average feeding rate of the welding wire is detected, and at least one of the forward feeding amplitude, the reverse feeding amplitude, the forward feeding period or the reverse feeding period is changed so that the detected average feeding rate equals the average feeding rate setting value, thereby automatically correcting the feeding rate pattern.

4 Claims, 3 Drawing Sheets

(51) Int. Cl.
*B23K 9/09* (2006.01)
*B23K 9/095* (2006.01)

(58) Field of Classification Search
USPC ............... 219/130.1, 130.33, 137 R, 137 PS
See application file for complete search history.

(56) References Cited

U.S. PATENT DOCUMENTS

| | | | |
|---|---|---|---|
| 2011/0309063 A1 | 12/2011 | Ott et al. | |
| 2012/0074114 A1 | 3/2012 | Kawamoto et al. | |
| 2012/0111842 A1* | 5/2012 | Fujiwara | B23K 9/125 219/130.33 |
| 2013/0068744 A1* | 3/2013 | Matsui | B23K 9/092 219/137 R |
| 2013/0082040 A1 | 4/2013 | Kawamoto et al. | |
| 2013/0082041 A1 | 4/2013 | Kawamoto et al. | |

FOREIGN PATENT DOCUMENTS

| | | |
|---|---|---|
| JP | 11-226732 | 8/1999 |
| JP | 2000-158136 | 6/2000 |
| JP | 2007-275995 | 10/2007 |
| JP | 2010-221240 | 10/2010 |
| JP | 5201266 | 2/2013 |
| WO | 2010/146844 | 12/2010 |
| WO | 2011/013321 | 2/2011 |
| WO | 2012/164833 | 12/2012 |

OTHER PUBLICATIONS

U.S. Appl. No. 15/110,855 to Daisuke Mori et al., filed Jul. 11, 2016.
U.S. Appl. No. 15/102,914 to Akihiro Ide, filed Jun. 9, 2016.
U.S. Appl. No. 15/122,278 to Akihiro Ide, filed Aug. 29, 2016.
U.S. Appl. No. 15/113,502 to Akihiro Ide et al., filed Jul. 22, 2016.
U.S. Appl. No. 15/122,288 to Akihiro Ide, filed Aug. 29, 2016.
China Office Action issued in corresponding China Patent Application No. 201580002522.8, dated Feb. 23, 2018, together with an English language translation thereof.
Japan Office Action issued in Japan Patent Application No. 2015-557809, dated Jan. 16, 2019, together with an English language machine translation.

* cited by examiner

ARC WELDING CONTROL METHOD

TECHNICAL FIELD

The present invention relates to an arc welding control method of alternating feeding of a welding wire between forward feeding and reverse feeding periodically according to a feeding rate pattern constituted of an amplitude of the forward feeding, an amplitude of the reverse feeding, a period of the forward feeding and a period of the reverse feeding, stored in correspondence to an average feeding rate setting value, and generating short-circuiting periods and arc periods to perform welding.

BACKGROUND ART

In a typical consumable electrode arc welding, welding is performed by feeding a welding wire as a consumable electrode at a constant feeding rate and generating an arc between the welding wire and base material. In the consumable electrode arc welding, both the welding wire and the base material are mostly placed in a welding state in which a short-circuiting period and an arc period are alternately repeated.

In order to further improve welding quality, there has been proposed a welding method of alternating feeding of the welding wire between forward feeding and reverse feeding periodically (see Patent Document 1, for example). Hereinafter this welding method will be explained.

FIG. 3 is a waveform diagram of the welding method in which the forward feeding and the reverse feeding are repeated periodically as to the feeding rate. (A) of this figure shows individual waveforms of a feeding-rate setting signal Fr (solid line) and an actual feeding rate Fw (broken line), (B) of this figure shows a waveform of a welding current Iw, (C) of this figure shows a waveform of a welding voltage Vw, and (D) of this figure shows a waveform of an average feeding-rate setting signal Far. Hereinafter explanation will be made with reference to this figure.

As shown in (A) of this figure, in each of the feeding-rate setting signal Fr and the feeding rate Fw, an upper side and a lower side than 0 represent a forward feeding period and a reverse feeding period, respectively. The forward feeding represents feeding of the welding wire in a direction approaching the base material, whilst the reverse feeding represents feeding of the welding wire in a direction separating from the base material. The feeding-rate setting signal Fr has a waveform which changes sinusoidally and shifts on the forward feeding side. Thus as an average value of the feeding-rate setting signal Fr is positive, the welding wire is fed forwardly in average.

As shown by the solid line in (A) of this figure, the feeding-rate setting signal Fr is 0 at a time point t1. A period from the time point t1 to a time point t2 corresponds to a forward feeding acceleration period. The feeding-rate setting signal Fr is the maximum value of the forward feeding at the time point t2. A period from the time point t2 to a time point t3 corresponds to a forward feeding deceleration period. The feeding-rate setting signal Fr is 0 at the time point t3. A period from the time point t3 to a time point t4 corresponds to a reverse feeding acceleration period. The feeding-rate setting signal Fr is the maximum value of the reverse feeding at the time point t4. A period from the time point t4 to a time point t5 corresponds to a reverse feeding deceleration period. Then a period from the time point t5 to a time point t6 is the forward feeding acceleration period again, and a period from the time point to to a time point t7 is the forward feeding deceleration period again. The maximum value of the forward feeding is a forward feeding amplitude Ws, and an absolute value of the maximum value of the reverse feeding is a reverse feeding amplitude Wr. A period from the time point t1 to the time point t3 is a forward feeding period Ts, and a period from the time point t3 to the time point t5 is a reverse feeding period Tr. Thus a feeding rate pattern of the feeding-rate setting signal Fr shown in (A) of this figure is a sine wave constituted of individual parameters of the forward feeding amplitude Ws, the reverse feeding amplitude Wr, the forward feeding period Ts and the reverse feeding period T1. For example, Ws is 50 m/min, Wr is 40 m/min, Ts is 5.4 ms and Tr is 4.6 ms. In this case, the single period is 10 ms, and the short-circuiting period and the arc period are alternately repeated with 100 Hz. An average value of the feeding rate in this case is about 4 m/min (an average value of the welding current is about 150 A).

As shown by the broken line in (A) of this figure, the feeding rate Fw is an actual feeding rate. The feeding rate represents a sinusoidal wave which rises and falls later than the feeding-rate setting signal Fr. The feeding rate Fw is 0 at a time point t11. A period from the time point t11 to a time point t21 corresponds to a forward feeding acceleration period. The feeding rate Fw is the maximum value of the forward feeding at the time point t21. A period from the time point t21 to a time point t31 corresponds to a forward feeding deceleration period. The feeding rate Fw is 0 at the time point t31. A period from the time point t31 to a time point t41 corresponds to a reverse feeding acceleration period. The feeding rate Fw is the maximum value of the reverse feeding at the time point t41. A period from the time point t41 to a time point t51 corresponds to a reverse feeding deceleration period. Then a period from the time point t51 to a time point t61 is the forward feeding acceleration period again, and a period from the time point t61 to a time point t71 is the forward feeding deceleration period again. This is due to transient characteristics of a feeding motor and a feeding resistance of a feeding path.

The average feeding-rate setting signal Far shown in (D) of this figure is a signal for setting the average value of the feeding rate Fw.

The feeding rate pattern of the feeding-rate setting signal Fr is set so that the average value of the feeding rate Fw equals the average feeding-rate setting signal Far. That is, the forward feeding amplitude Ws, the reverse feeding amplitude Mk, the forward feeding period Ts and the reverse feeding period Tr are stored in advance in correspondence with the average feeding-rate setting signal Far.

A welding power supply controlled to a constant voltage is used for the consumable electrode arc welding. Short circuit between the welding wire and the base material occurs mostly before or after the maximum value of the feeding rate Fw in the forward feeding at the time point t21. This figure shows a case where the short circuit occurs at a time point t22 during the forward feeding deceleration period after the maximum value in the forward feeding. If the short circuit occurs at the time point t22, the welding voltage Vw rapidly reduces to a short circuit voltage value of a few volts as shown in (C) of this figure, whilst the welding current Iw increases gradually as shown in (B) of this figure.

As shown in (A) of this figure, from the time point t31, as the feeding rate Fw is placed in the reverse feeding period, the welding wire is reversely fed. The short circuit is released by this reverse feeding, and hence an arc is generated again at a time point t32. The arc is regenerated mostly before or after the maximum value of the feeding rate Fw in the reverse feeding at the time point t41. This figure shows a case where the arc is generated at the time point t32 during the reverse feeding acceleration period before the maximum value of the reverse feeding. Thus a time period from the time point t22 to the time point t32 becomes the short-circuiting period.

If the arc is regenerated at the time point t32, the welding voltage Vw increases rapidly to an arc voltage value of several tens of volts as shown in (C) of this figure. As shown in (B) of this figure, the welding current Iw starts changing from the maximum value state during the short-circuiting period.

As shown in (A) of this figure, during a period from the time point t32 to the time point t51, as the feeding rate Fw is in the reverse feeding state, the welding wire is raised and hence a length of the arc becomes longer gradually. If the arc length becomes longer, the welding voltage Vw increases, and hence the welding current Iw reduces due to the constant voltage control. Thus during the reverse feeding period in the arc period from the time point t32 to the time point t51, the welding voltage Vw increases gradually as shown in (C) of this figure, whilst the welding current Iw reduces gradually as shown in (B) of this figure.

Then the next short circuit occurs at a time point t62 within the forward feeding deceleration period of the feeding rate Fw from the time point t61 to the time point t71. A time period from the time point t32 to the time point t62 is the arc period. As shown in (A) of this figure, during a period from the time point t51 to the time point t62, as the feeding rate Fw is in the forward feeding state, the welding wire is forwardly fed and hence a length of the arc becomes shorter gradually. If the arc length becomes shorter, the welding voltage Vw reduces, and hence the welding current Iw increases due to the constant voltage control. Thus during the forward feeding period in the arc period from the time point t51 to the time point t62, the welding voltage Vw reduces gradually as shown in (C) of this figure, whilst the welding current Iw increases gradually as shown in (B) of this figure.

As described above, in the welding method of repeating the forward feeding and the reverse feeding of the welding wire alternately, the repetition period of the short circuit and the arc can be set to a desired value despite that such the setting is impossible in the related art of the feeding at a constant feeding rate. Thus a generation amount of spatter can be reduced and improvement of welding quality such as improvement of bead appearance can be achieved.

PRIOR ART DOCUMENT

Patent Document

Patent Document 1: Japanese Patent No. 5201266

SUMMARY OF INVENTION

Problems to be Solved by Invention

As described above, in the related art, when the average feeding-rate setting signal Far is set, the feeding-rate setting signal of the feeding rate pattern corresponding to a value of the average feeding-rate setting signal Far is set. There arises a phase difference between the waveform of the feeding-rate setting signal Fr and the waveform of the feeding rate Fw each changing periodically, due to influence of the transient characteristics of the feeding motor and the feeding resistance of the feeding path. The transient characteristics differs depending on the kind of the feeding motor to be used. Further the feeding resistance of the feeding path differs depending on the kind of the welding torch to be used. Furthermore when the welding is performed repeatedly, the feeding path is worn away gradually and hence the feeding resistance changes. The phase difference changes between the waveform of the feeding-rate setting signal Fr and the waveform of the feeding rate Fw according to these changes of the feeding resistance. That is, even if a value of the average feeding-rate setting signal Far is constant, as the average value of the feeding rate Fw changes according to the change of the feeding resistance, the average value of the welding current Iw changes. As a result, the welding quality changes.

Accordingly an object of the present invention is to provide an arc welding control method which, in a welding operation of alternating feeding of a welding wire between forward feeding and reverse feeding periodically, can maintain an average value of a feeding rate at a constant value to stabilize welding quality even if a feeding resistance changes.

Means for Solving Problems

In order to solve the above-described problem, according to the present invention, there is provided an arc welding control method of alternating feeding of a welding wire between forward feeding and reverse feeding periodically according to a feeding rate pattern constituted of a forward feeding amplitude, a reverse feeding amplitude, a forward feeding period and a reverse feeding period, stored in correspondence to an average feeding rate setting value, and generating short-circuiting periods and arc periods to perform welding, the arc welding control method comprising: detecting an average feeding rate of the welding wire, and changing at least one of the forward feeding amplitude, the reverse feeding amplitude, the forward feeding period or the reverse feeding period so that the detected average feeding rate equals the average feeding rate setting value, thereby automatically correcting the feeding rate pattern.

According to the present invention, the arc welding control method further comprising storing the automatically-corrected feeding rate pattern upon completion of the welding.

According to the present invention, in the arc welding control method, individual changeable ranges are provided in the forward feeding amplitude, the reverse feeding amplitude, the forward feeding period and the reverse feeding period, respectively.

Advantageous Effects of Invention

According to the present invention, even if a feeding resistance changes, an average value of the feeding rate can always be kept in an equal state with the average feeding rate setting value. Accordingly in the welding operation of alternating the feeding of the welding wire between the forward feeding and the reverse feeding periodically, the present invention can maintain an average value of the feeding rate at a constant value to stabilize welding quality even if the feeding resistance changes.

EMBODIMENTS OF INVENTION

Hereinafter an embodiment according to the present invention will be explained with reference to drawings.

First Embodiment

Figure 1:
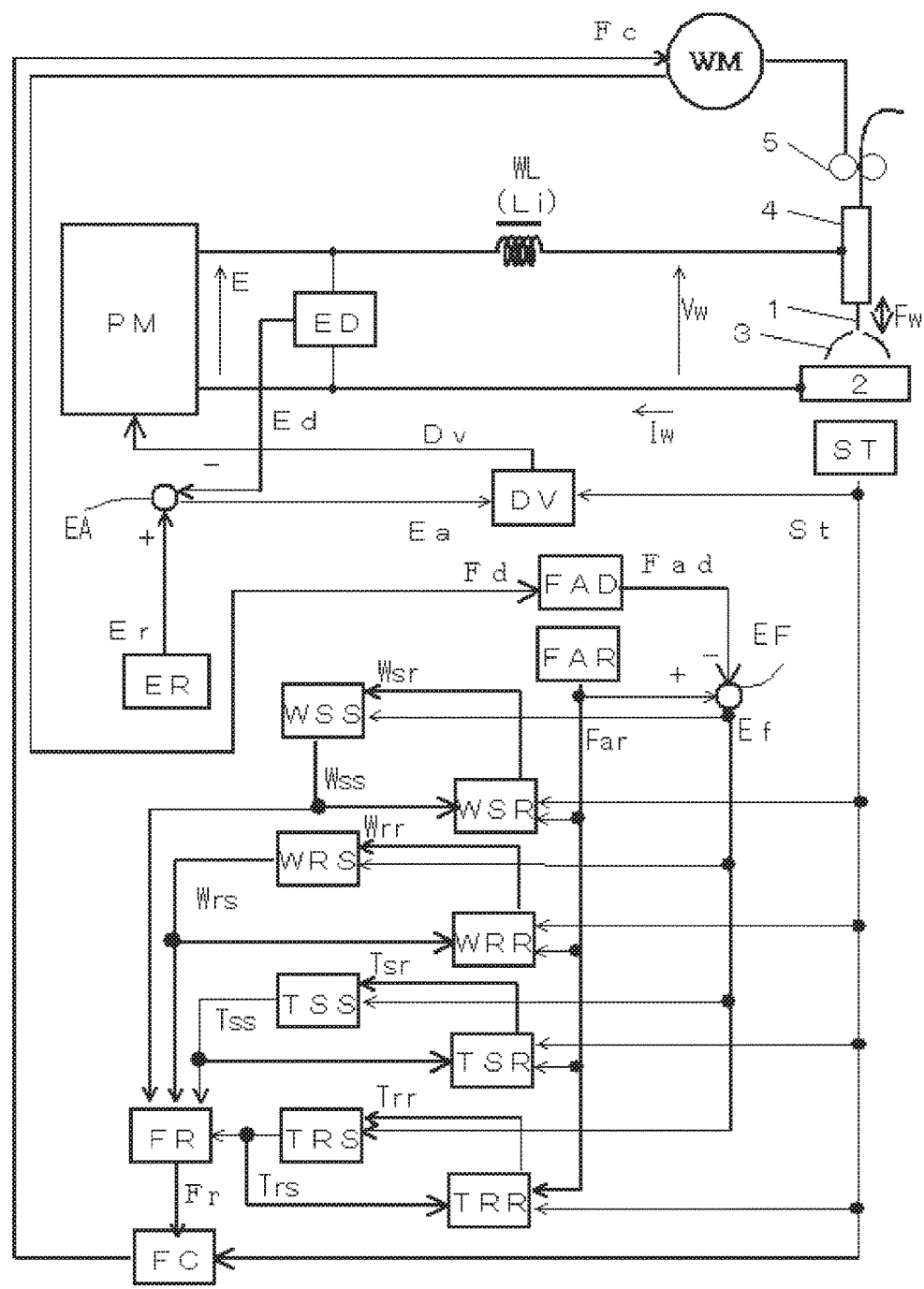
FIG. 1 A block diagram illustrating a welding power supply for implementing an arc welding control method according to a first embodiment of the present invention.

FIG. 1 is a block diagram illustrating a welding power supply for implementing an arc welding control method according to a first embodiment of the present invention. Hereinafter individual blocks will be explained with reference to this figure.

Using a power of three-phase 200V or the like from a commercial power supply (not shown) as input, a power supply main circuit PM subjects the input power to an output control such as an inverter control according to a drive signal Dv described later, and outputs an output voltage E. Although not shown in the figure, this power supply main circuit PM includes a primary rectifier for rectifying the commercial power supply, a smoothing capacitor for smoothing the rectified DC, an inverter circuit which is driven by the drive signal Dv and converts the smoothed DC into a high-frequency AC, a high-frequency transformer for stepping down the high-frequency AC to a voltage value suitable for welding, and a secondary rectifier for rectifying the stepped-down high-frequency AC to a DC.

A reactor WL smooths the output voltage E. An inductance value of the reactor WL is, for example, 200 µH.

Using a feed control signal Fc described later as input, a feeding motor WM feeds a welding wire 1 at a feeding rate Fw in a manner of alternating forward feeding and reverse feeding periodically. The feeding motor WM includes an encoder (not shown) which outputs a feeding-rate detection signal H. A motor having high transient responsiveness is used as the feeding motor WM. In some cases, the feeding motor WM is installed near a tip of a welding torch 4 in order to increase a changing rate of the feeding rate Fw and an inversion speed of the feeding direction of the welding wire 1. Further in some cases, a push-pull feeding system is configured by using two feeding motors WM.

The welding wire 1 is fed within the welding torch 4 in accordance with rotation of a feeding roll 5 coupled to the feeding motor WM and thus an arc 3 is generated between this wire and base material 2. A welding voltage Vw is applied between a power supply tip (not shown) within the welding torch 4 and the base material 2, and thus a welding current Iw flows.

An output voltage setting circuit ER outputs an output voltage setting signal Er set in advance. An output voltage detection circuit ED detects and smooths the output voltage E, thereby outputting an output voltage detection signal Ed.

Using the output voltage setting signal Er and the output voltage detection signal Ed as input, a voltage error amplifier circuit EA amplifies an error between the output voltage setting signal Er (+) and the output voltage detection signal Ed (−) and outputs a voltage error amplified signal Ea. This circuit controls the welding power supply to a constant voltage.

A welding start circuit ST outputs a welding start signal St which becomes a high level or a low level in response to turning-on or off of a torch switch, respectively. Welding is started when the welding start signal St becomes the high level, whilst stopped when the welding start signal becomes the low level.

Using the welding start signal St and the voltage error amplified signal Ea as input, in a case where the welding start signal St is at the high level, a driving circuit DV performs a PWM modulation control based on the voltage error amplified signal Ea and outputs the drive signal Dv for driving the inverter circuit.

An average feeding-rate setting circuit FAR outputs an average feeding-rate setting signal Far set in advance. Using the feeding-rate detection signal Fd as input, a average feeding-rate detection circuit FAD calculates an average value of this signal and outputs an average feeding-rate detection signal Fad. Using the average feeding-rate setting signal Far and the average feeding-rate detection signal Fad as input, a feeding error amplifier circuit EF amplifies an error between the average feeding-rate setting signal Far (+) and the average feeding-rate detection signal Fad (−) and outputs a feeding error amplified signal Ef.

Using the average feeding-rate setting signal Far, a forward feeding amplitude correction signal Wss described later and the welding start signal St as input, a forward feeding amplitude setting circuit WSR performs the following processing and outputs a forward feeding amplitude setting signal Wsr, (1) Outputting the forward feeding amplitude setting signal Wsr stored in correspondence to the average feeding-rate setting signal Far. 2) When the welding start signal St changes to the low level (stop) from the high level (start), overwriting a value of the forward feeding amplitude correction signal Wss at that tune point on the forward feeding amplitude setting signal Wsr and storing it.

During the welding, using the forward feeding amplitude setting signal Wsr and the feeding error amplified signal Ef as input, the forward feeding amplitude correction circuit WSS performs correction according to a calculation of Wss=Wsr+∫Ef·dt and outputs the forward feeding amplitude correction signal Wss. In a case where a value of the feeding error amplified signal Ef is positive, as a value of the average feeding-rate detection signal Fad is smaller than a value of the average feeding-rate setting signal Far, the forward feeding amplitude correction signal Wss is corrected so as to be increased. In contrast, when a value of the feeding error amplified signal Ef is negative, the forward feeding amplitude correction signal Wss is corrected so as to be reduced. This correction is performed within a changeable range set by an upper limit and a lower limit.

Using the average feeding-rate setting signal Far, a reverse feeding amplitude correction signal Wrs described later and the welding start signal St as input, a reverse feeding amplitude setting circuit WRR performs the following processing and outputs a reverse feeding amplitude setting signal Wrr. 1) Outputting the reverse feeding amplitude setting signal Wrr stored in correspondence to the average feeding-rate setting signal Far. 2) When the welding start signal St changes to the low level (stop) from the high level (start), overwriting a value of the reverse feeding amplitude correction signal Wrs at that time point on the reverse feeding amplitude setting signal Wrr and storing it.

During the welding, Using the reverse feeding amplitude setting signal Wrr and the feeding error amplified signal Ef as input, the reverse feeding amplitude correction circuit WRS performs correction according to a calculation of Wrs=Wrr−∫Ef·dt and outputs the reverse feeding amplitude correction signal Wrs. In a case where a value of the feeding error amplified signal Ef is positive, as a value of the average feeding-rate detection signal Fad is smaller than a value of the average feeding-rate setting signal Far, the reverse feeding amplitude correction signal Wrs is corrected so as to be reduced. In contrast, when a value of the feeding error amplified signal Ef is negative, the reverse feeding amplitude correction signal Wrs is corrected so as to be increased. This correction is performed within a changeable range set by an upper limit and a lower limit.

Using the average feeding-rate setting signal Far, a forward feeding period correction signal Tss described later and the welding start signal St as input, a forward feeding period setting circuit TSR performs the following processing and outputs a forward feeding period setting signal Tsr. 1) Outputting forward feeding period setting signal Tsr stored in correspondence to the average feeding-rate setting signal Far. 2) When the welding start signal St changes to the low level (stop) from the high level (start), overwriting a value of the forward feeding period correction signal Tss at that time point on the forward feeding period setting signal Tsr and storing it.

During the welding, Using the forward feeding period setting signal Tsr and the feeding error amplified signal Ef as input, the forward feeding period correction circuit TSS performs correction according to a calculation of Tss=Tsr+ ∫Ef·dt and outputs the forward feeding period correction signal Tss. In a case where a value of the feeding error amplified signal Ef is positive, as a value of the average feeding-rate detection signal Fad is smaller than a value of the average feeding-rate setting signal Far, the forward feeding period correction signal Tss is corrected so as to be increased. In contrast, when a value of the feeding error amplified signal Ef is negative, the forward feeding period correction signal Tss is corrected s as to be reduced. This correction is performed within a changeable range set by an upper limit and a lower limit.

Using the average feeding-rate setting signal Far, a reverse feeding period correction signal TB described later and the welding start signal St as input, a reverse feeding period setting circuit TRR performs the following processing and outputs a reverse feeding period setting signal Trr. 1) Outputting the reverse feeding period setting signal Trr stored in correspondence to the average feeding-rate setting signal Far. 2) When the welding start signal St changes to the low level (stop) from the high level (start), overwriting a value of the reverse feeding period correction signal Trs at that time point on the reverse feeding period setting signal Trr and storing it.

During the welding, Using the reverse feeding period setting signal Trr and the feeding error amplified signal Ef as input, the reverse feeding period correction circuit TRS performs correction according to a calculation of Trs=Trr− ∫Ef·dt and outputs the reverse feeding period correction signal Trs. In a case where a value of the feeding error amplified signal Ef is positive, as a value of the average feeding-rate detection signal Fad is smaller than a value of the average feeding-rate setting signal Far, the reverse feeding period correction signal Trs is corrected so as to be reduced. In contrast, when a value of the feeding error amplified signal Ef is negative, the reverse feeding period correction signal Trs is corrected so as to be increased. This correction is performed within a changeable range set by an upper limit and a lower limit.

Using the forward feeding amplitude correction signal Wss, the reverse feeding amplitude correction signal Wrs, the forward feeding period correction signal Tss and the reverse feeding period correction signal Trs as input, a feeding-rate setting circuit FR outputs a feeding-rate setting signal Fr having a sinusoidal feeding-rate pattern formed by these parameters. A period where the feeding-rate setting signal Fr is 0 or more is a forward feeding period, whilst a period where this signal is smaller than 0 is a reverse feeding period.

Using the feeding-rate setting signal Fr and the welding start signal St as input, a feeding control circuit FC outputs, to the feeding motor WM, a feeding control signal Fc for feeding the welding wire 1 at the feeding rate Fw corresponding to a value of the feeding-rate setting signal Fr in a case where the welding start signal St is at the high level (start), and outputs the feeding control signal Fc representing a feeding stop instruction in a case where the welding start signal St is at the low level (stop).

Figure 2:
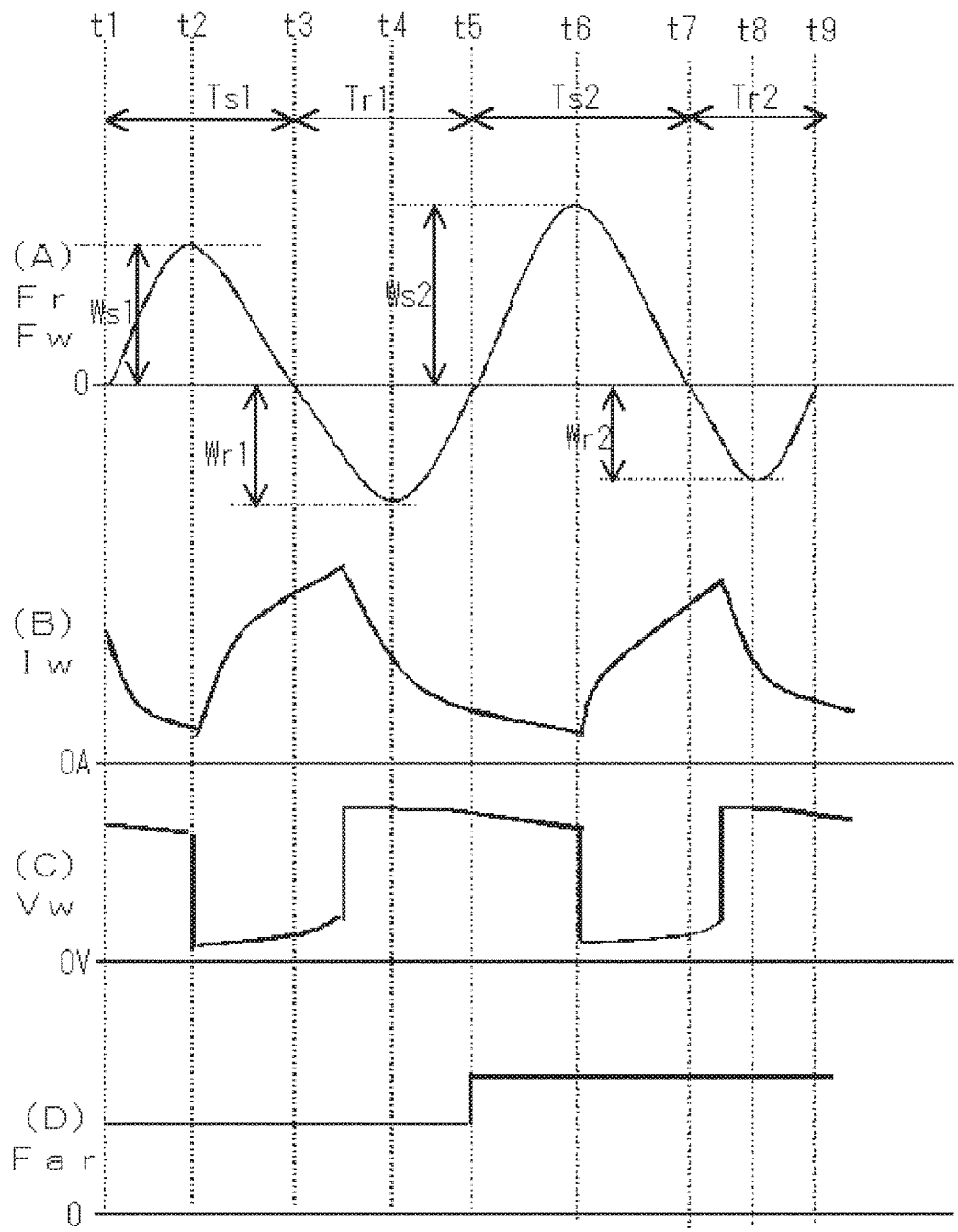
FIG. 2 A timing chart illustrating individual signals in the welding power supply of FIG. 1, for explaining the arc welding control method according to the first embodiment of the present invention.
Figure 3:
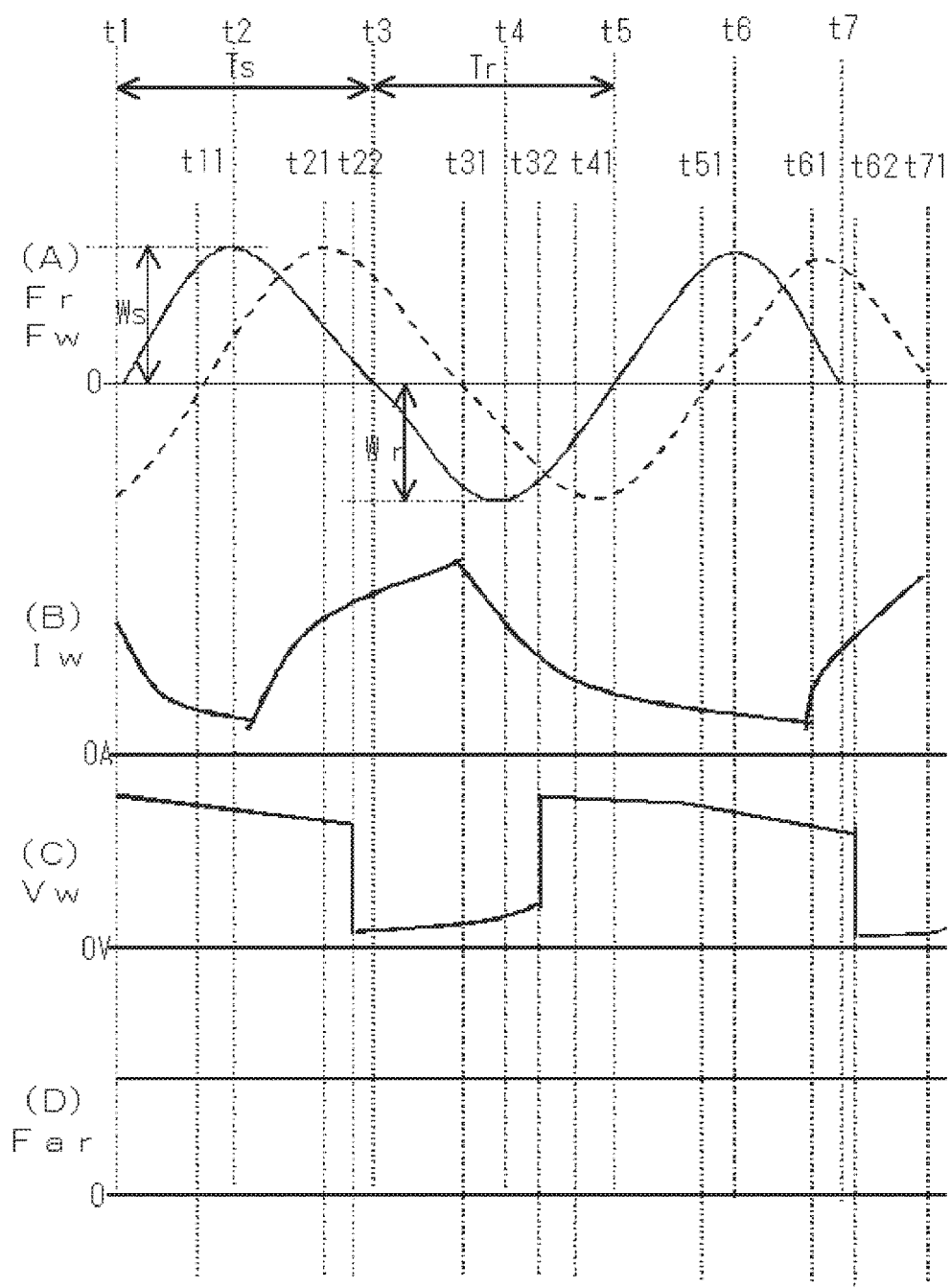
FIG. 3 A waveform diagram of the welding method according to a related art in which forward feeding and reverse feeding are repeated periodically as to a feeding rate.

FIG. 2 is a timing chart illustrating individual signals in the welding power supply of FIG. 1, for explaining the arc welding control method according to the first embodiment of the present invention. (A) of this figure shows temporal change of the feeding-rate setting signal Fr, (B) of this figure shows temporal change of the welding current Iw, (C) of this figure shows temporal change of the welding voltage Vw, and (D) of this figure shows temporal change of the average feeding-rate setting signal Far. This figure corresponds to FIG. 3, and an operation of this figure same as that of FIG. 3 will not be repeated. Hereinafter explanation will be made with reference to this figure.

As shown by a solid line in (A) of this figure, in a period from a time point t1 to a time point t5 concerning the feeding-rate setting signal Fr, the forward feeding amplitude is Ws1, the reverse feeding amplitude is Wr1, the forward feeding period is Ts1 and the reverse feeding period is Tr1. It is assumed that, at the time point t5, a value of the average feeding-rate detection signal Fad is smaller than a value of the average feeding-rate setting signal Far. As Fad is smaller than Far, the forward feeding amplitude correction circuit WSS of FIG. 1 corrects the forward feeding amplitude in the next period (from the time point t5 to a time point t9) to Ws2, and thus Ws2 becomes larger than Ws1.

Similarly the reverse feeding amplitude correction circuit WRS of FIG. 1 corrects the reverse feeding amplitude in the next period (from the time point t5 to the time point t9) to Wr2, and thus Wr2 becomes smaller than Wr1.

Similarly the forward feeding period correction circuit TSS of FIG. 1 corrects the forward feeding period in the next period (from the time point t5 to the time point t9) to Ts2, and thus Ts2 becomes larger than Ts1.

Similarly the reverse feeding period correction circuit TRS of FIG. 1 corrects the reverse feeding period in the next period (from the time point t5 to the time point t9) to Tr2, and thus Tr2 becomes smaller than Tr1.

As described above, as the feeding rate pattern of the feeding-rate setting signal Fr from the time point t5 to the time point t9 is corrected, an average value of the feeding rate Fw becomes equal to a value of the average feeding-rate setting signal Far shown in (D) of this figure.

If Fad is larger than Far at the time point t5, correction is made to be Ws2<Ws1, Wr2>Wr1, Ts2<Ts1, and Tr2>Tr1.

The explanation is made as to the case where each of the forward feeding amplitude, the reverse feeding amplitude, the forward feeding period and the reverse feeding period is corrected. Alternatively, at least one of these parameters may be corrected. The correction may be performed at every predetermined period of the feeding-rate setting signal Fr. Correction gains of these parameters may be set to different values, respectively. The explanation is made as to the case where the feeding-rate setting signal Fr changes in the form of the sinusoidal wave. Alternatively, this signal may be changed in the form of a trapezoidal wave, a triangular wave or the like.

According to the first embodiment, the average feeding rate is detected, and at least one of the forward feeding amplitude, the reverse feeding amplitude, the forward feeding period or the reverse feeding period is changed so that the detected average feeding rate equals the average feeding rate setting value, and thereby the feeding rate pattern is automatically corrected. Consequently, even if a feeding resistance changes, an average value of the feeding rate can always be kept in an equal state with the average feeding rate setting value. Accordingly in the welding operation of alternating the feeding of the welding wire between the forward feeding and the reverse feeding periodically, this embodiment can maintain an average value of the feeding rate at a constant value to stabilize welding quality even if the feeding resistance changes.

Further according to the first embodiment, the automatically-corrected feeding rate pattern can be stored upon completion of the welding. That is, the forward feeding amplitude, the reverse feeding amplitude, the forward feeding period and the reverse feeding period each corrected finally at the time of completing the welding can be stored. Consequently, as the next welding can be started with the suitable feeding rate pattern having been corrected, the welding quality can be further stabled.

Further according to the first embodiment, the individual changeable ranges are provided in the forward feeding amplitude, the reverse feeding amplitude, the forward feeding period and the reverse feeding period, respectively. That is, the changeable range of the correction value of each of the parameters is limited by setting the individual upper and lower limits. These changeable ranges are set as ranges in which a welding state becomes stable. Consequently, the welding state can be suppressed being placed in an unstable state due to the correction of the parameters.

INDUSTRIAL APPLICABILITY

The present invention can provide the arc welding control method which, in the welding operation of alternating the feeding of the welding wire between the forward feeding and the reverse feeding periodically, can maintain an average value of the feeding rate at the constant value to stabilize the welding quality even if the feeding resistance changes.

Although the present invention is explained with reference to the particular embodiment, the present invention is not limited thereto but the embodiment may be changed in various manners within a range not departing from the technical concept disclosed in the present invention.

This application is based on Japanese Patent Application (Japanese Patent Application No. 2014-004700) filed on Jan. 15, 2014, the content of which is incorporated herein by reference.

DESCRIPTION OF REFERENCE NUMERALS 1 welding wire
2 base material
3 arc
4 welding torch
5 feeding roll
DV driving circuit
Dv drive signal
E output voltage
EA voltage error amplifier circuit
Ea voltage error amplified signal
ED output voltage detection circuit
Ed output voltage detection signal
EF feeding error amplifier circuit
Ef feeding error amplified signal
ER output voltage setting circuit
Er output voltage setting signal
FAD average feeding-rate detection circuit
Fad average feeding-rate detection signal
FAR average feeding-rate setting circuit
Far average feeding-rate setting signal
FC feeding control circuit
Fc feeding control signal
Fd feeding-rate detection signal
FR feeding-rate setting circuit
Fr feeding-rate setting signal
Fw feeding rate
Iw welding current
PM power supply main circuit
ST welding start circuit
St welding start signal
Tr reverse feeding period
TRR reverse feeding period setting circuit
Trr reverse feeding period setting signal
TRS reverse feeding period correction circuit
Trs reverse feeding period correction signal
TSS forward feeding period correction circuit
Tss forward feeding period correction signal
Vw welding voltage
WL reactor
WM feeding motor
Wr reverse feeding amplitude
WRR reverse feeding amplitude setting circuit
Wrr reverse feeding amplitude setting signal
WRS reverse feeding amplitude correction circuit
Wrs reverse feeding amplitude correction signal
Ws forward feeding amplitude
WSR forward feeding amplitude setting circuit
Wsr forward feeding amplitude setting signal
WSS forward feeding amplitude correction circuit
Wss forward feeding amplitude correction signal

The invention claimed is:

1. An arc welding control method comprising:
alternating feeding of a welding wire between forward feeding and reverse feeding periodically according to a feeding rate pattern, the feeding rate pattern including a forward feeding amplitude, a reverse feeding amplitude, a forward feeding period and a reverse feeding period, the feeding rate pattern being stored in association with an average feeding rate setting value;
generating short-circuiting periods and arc periods to perform welding;
automatically correcting the feeding rate pattern; and
overwriting the feeding rate pattern, stored in association with the average feeding rate setting value, with the automatically-corrected feeding rate pattern upon completion of the welding,
wherein the automatically correcting the feeding rate pattern comprises:
detecting, by an encoder in a feeding motor that feeds the welding wire, a feeding rate of the welding wire;
calculating an average feeding rate of the welding wire based on the detected feeding rate of the welding wire;
calculating a difference between the calculated average feeding rate and the average feeding rate setting value; and changing at least one of the forward feeding amplitude, the reverse feeding amplitude, the forward feeding period or the reverse feeding period based on the calculated difference, so that the calculated average feeding rate equals the average feeding rate setting value.

2. An arc welding control method comprising:

alternating feeding of a welding wire between forward feeding and reverse feeding periodically according to a feeding rate pattern, the feeding rate pattern including a forward feeding amplitude, a reverse feeding amplitude, a forward feeding period and a reverse feeding period, the feeding rate pattern being stored in association with an average feeding rate setting value;

generating short-circuiting periods and arc periods to perform welding; and automatically correcting the feeding rate pattern, wherein the automatically correcting the feeding rate pattern comprises:

detecting, by an encoder in a feeding motor that feeds the welding wire, a feeding rate of the welding wire;

calculating an average feeding rate of the welding wire based on the detected feeding rate of the welding wire;

calculating a difference between the calculated average feeding rate and the average feeding rate setting value; and changing at least one of the forward feeding amplitude, the reverse feeding amplitude, the forward feeding period or the reverse feeding period based on the calculated difference, so that the calculated average feeding rate equals the average feeding rate setting value, wherein a changeable range is provided in each of the forward feeding amplitude, the reverse feeding amplitude, the forward feeding period and the reverse feeding period, and in the changing, at least one of the forward feeding amplitude, the reverse feeding amplitude, the forward feeding period or the reverse feeding period is changed such that an amount of change in each of the forward feeding amplitude, the reverse feeding amplitude, the forward feeding period and the reverse feeding period is within the changeable range.

3. The arc welding control method according to claim 1, wherein a changeable range is provided in each of the forward feeding amplitude, the reverse feeding amplitude, the forward feeding period and the reverse feeding period, and in the changing, at least one of the forward feeding amplitude, the reverse feeding amplitude, the forward feeding period or the reverse feeding period is changed such that an amount of change in each of the forward feeding amplitude, the reverse feeding amplitude, the forward feeding period and the reverse feeding period is within the changeable range.

4. The arc welding control method according to claim 1, wherein, in the overwriting, at least one of the forward feeding amplitude, the reverse feeding amplitude, the forward feeding period or the reverse feeding period of the feeding rate pattern is overwritten with the at least one of the forward feeding amplitude, the reverse feeding amplitude, the forward feeding period or the reverse feeding period which is changed in the automatically correcting.

* * * * *